Dec. 25, 1951  R. M. BARNARD ET AL  2,579,462
ELECTRIC CONDENSER
Filed April 1, 1949  2 SHEETS—SHEET 1
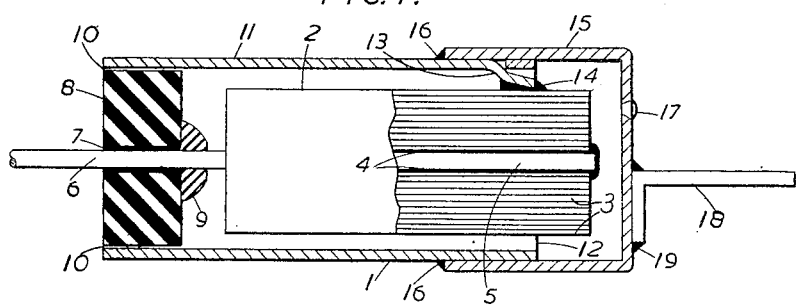
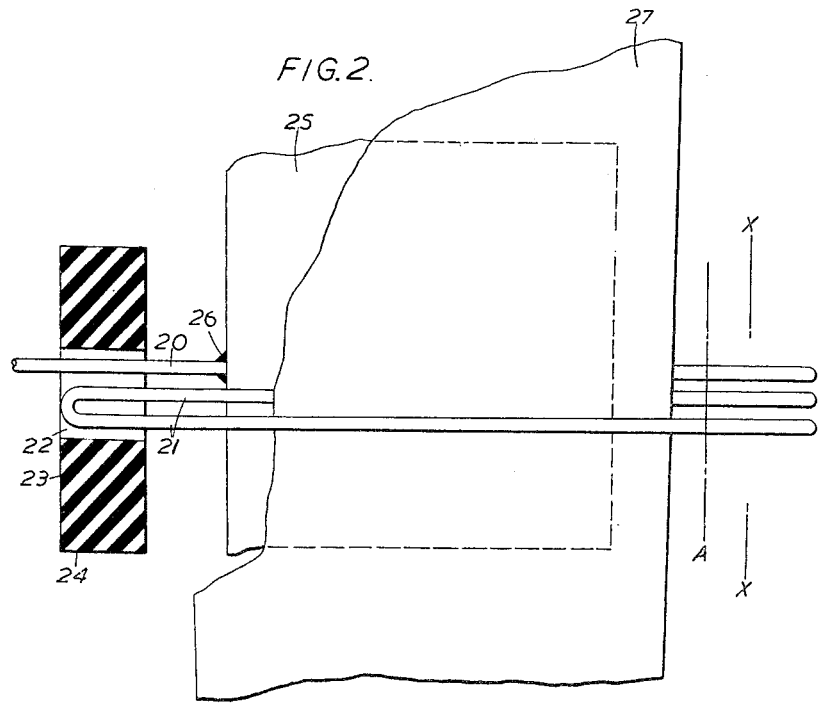
INVENTORS
ROY M. BARNARD
WILLIAM J. STRAY
BY
ATTORNEY Patented Dec. 25, 1951

2,579,462

UNITED STATES PATENT OFFICE 2,579,462

ELECTRIC CONDENSER

Roy Mayne Barnard and William John Stray, London, England, assignors to International Standard Electric Corporation, New York, N. Y.

Application April 1, 1949, Serial No. 85,016
In Great Britain April 20, 1948

1 Claim. (Cl. 175—41)

This invention relates to electrical condensers.

Paper dielectric tubular electrical condensers are usually manufactured by winding coils, constituting at least one capacitor unit, with interleaved paper and metal foils and then impregnating the said units with a suitable insulating material. The winding of the coils is performed, on say, a paper unit mandrel and on completion of the winding the said mandrel is removed and arrangements are made for assembly of the coils in a suitable case. The use of a mandrel sets a limit in practice to the smallest size coil unit that can be produced. For instance, in fabricating condensers, having capacities of the order of 0.05 or 0.1 micro-microfarad operable at a working voltage of about 250 volts having a limit on the physical dimensions of approximately ¼″ in diameter and about 1½″ in length, the said method of winding introduces difficulties. The case in which the said capacitor units are assembled may take the form of a metal tube terminated at one or both ends by metal and/or insulating end pieces through which lead out wires are brought out as terminals for the electrodes of the capacitor units for electrical connections to associated circuit components. For example in U. S. Patent No. 2,452,540 there is described and claimed an electrical condenser comprising a condenser unit (here identified as a capacitor unit) surrounded by a casing consisting of a pair of end caps and a rolled metal tube of hard brass or other springy metal having an overlapping soldered seam.

Further in order to ensure complete sealing of the said condenser assembly against ingress of moisture into the said case, various resistant materials such as neoprene bungs are generally employed.

It is the object of the present invention to provide means for removing the said limit to the size of the coil units and for sealing the case completely by metal and/or ceramic material against the ingress of moisture.

According to the invention, there is provided an electric condenser, comprising a wound interleaved paper and metal foil capacitor unit wound integrally with a core, formed of at least two metal wires and totally enclosed and hermetically sealed in a cylindrical metal container, one of said wires being sealed through an insulating closure sealed to one end of said container, and forming one terminal of the device, the said container being connected to an electrode of the capacitor to form or be connected to a second terminal of the device, and a metal end cap sealed to the other end of the said container.

Further according to one embodiment of the invention the said core is formed of a single length of copper wire reinforced by a sharply bent steel wire which forms the other wire, and is further used to hold the paper and metal foils and be used at one or both ends as support for the winding of the said capacitor unit.

In order that the invention may be clearly understood a description will now be given of two of its embodiments, reference being made for this purpose to the accompanying drawings in which:

Fig. 1 shows a longitudinal sectional view of a condenser according to one embodiment of the invention.

Fig. 2 shows an outline drawing for explaining the method of assembly of the capacitor unit for any condenser according to the invention.

Figure 3:
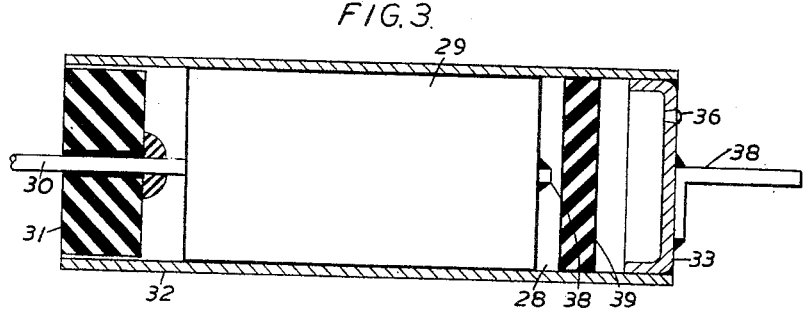
Fig. 3 shows a longitudinal part sectional view of a condenser according to a further embodiment of the invention.

Referring to Fig. 1 the condenser 1, according to this embodiment, comprises a capacitor unit 2 wound of interleaved paper and tinned copper foils 3. One of the said copper foils forming one electrode is soldered to (as shown at 4) and thus integral with, a core 5 around which the capacitor unit is wound. The core 5 is formed, as hereinafter explained, of two metal wires one of which is a single length of copper wire 6, the other being steel wire sharply bent as a hair pin. The said copper wire is made long enough to project through the central aperture 7 of an insulating closure 8 in the form of an annular silvered ceramic disc and is soldered thereto as at 9. The outer circumferential surface of the said disc is solder sealed as at 10 in the usual way to the inside of the cylindrical metal container 11. At the open end 12 of the said container 11, two saw cuts are made parallel substantially to the longitudinal axis of the container, the said cuts being approximately ⅛″ apart and each continuing for approximately ¼″ along the length of the container towards the closed end, thus producing a metal tag 13 which is bent inwards pressing against second said tinned copper foil to which it may be soldered as at 14. Thus it is seen that the container being integrally connected to the second electrode may form a second terminal of the said condenser. A metal end cap 15 in the form of a cylinder closed at one end as shown, with its inner diameter substantially equal to the outer diameter of the container 11 is assembled overlapping as shown at 16 and the said assembly solder sealed. An insulating disc (not shown) substantially of the same diameter as the inside of the end cap 15 may be interposed between the capacitor 2 and the end caps 15, as in Fig. 3. An opening in the form of a small drawn hole 17 is formed on the end of the end cap as shown for allowing the injection of impregnating and filling capacitor unit 2. After the process of injection is complete the said hole is sealed by solder. If it is necessary a wire 18 may be welded to the end cap 15 as shown at 19, to form the second terminal of the condenser in such cases.

The condenser is thus completely sealed by metal or ceramic against the ingress of moisture, and solder connections are made between the electrodes of the capacitor unit and their respective terminals.

The procedure for winding and assembly of the capacitor unit according to the invention will now be described in connection with Fig. 2. A core is prepared, in the case of this example, of two metal wires 20 and 21 in the form of a "bundle." Of the two wires, 20 a single length of copper, acts as one terminal of the condenser being projected through the central hole 22 of a ceramic insulator 23. The insulator is in the form of an annular disc silvered along its periphery 24, and about its central hole 22, the core being soldered to this silvering to form a seal. The second wire 21 of the core is a steel wire sharply bent to a hair pin shape. This wire 21 so formed is used to reinforce the core and capacitor assembly as will be seen from the following description. Having soldered the core to the ceramic disc the core assembly so formed is gripped at the insulator end by means of a chuck or like device. One of the tinned copper foils 25 is gripped, between the copper wire 20 and one of the straight parts of the steel wire 21, and it is soldered to the said wire 20 as shown at 26. One or more paper foils 27, forming the dielectric is gripped between the two straight parts of the steel wire 21 as shown. After this assembly of paper and metal foils a second chuck is used to grip the assembly at some such position as XX, thus providing a steadying effect on the assembly. Both the chucks are now driven to start the winding and after a few turns of the core a second metal foil (not shown) is introduced and winding is recommenced. This second foil forms the second electrode of the capacitor unit. When sufficient length of the metal electrodes have been wound, the first metal foil is cut and winding is allowed to continue for another three or four more turns.

Then the dielectric foil or foils are cut and winding continues with only the second metal foil until a predetermined overall diameter is reached. The tinned copper foil forming the second electrode is then terminated by soldering. The surplus wires of the core are removed close to the capacitor as at A. It is of interest to note that for a capacity of 0.02 micromicrofarad and under the incidence of weak spots in the paper foils at present commercially available the arrangements of this invention may permit a single paper foil winding to be employed.

Figure 4:
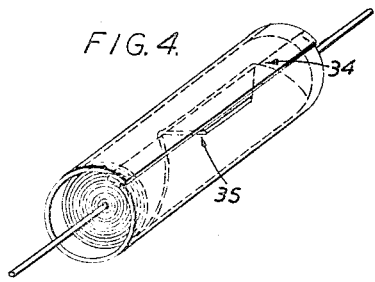
Fig. 4 shows in outline a partly assembled condenser according to the embodiment of Fig. 3 with one of the end caps disconnected.

Referring now to Figs. 3 and 4, Fig. 3 shows in part a section a second embodiment of the condenser 28 according to this invention. The capacitor unit 29 is assembled as already described while 30 identifies the copper wire forming as before one of the terminals for the condenser 28. 31 represents the ceramic closure as before sealed to the terminal 30 and the container 32 which is in the form of a metal cylinder as before. It is to be noted that the winding of the capacitor unit is such that its overall diameter is the same as the full outside diameter of the ceramic closure 31. This brings the whole of the longitudinal surface area of the outer or the second metal foil of the capacitor unit 29 in direct electrical contact with the inside of the metal container, to which it may or may not be soldered. The metal container, in this case, is in the form of a metal casing consisting of a pair of end caps, an insulating ceramic end cap 31 and a metal end cap 33 and a cylinder 32 formed, as described in U. S. Patent No. 2,452,540, of a rolled metal tube of hard brass or other springy metal having an overlapping soldered seam as in 34, Fig. 4. The final edge of the second metal foil is cut in a taper to allow its entry through the opening 35, Fig. 4, between the surfaces of the overlapping seam as marked by the dotted line. The end of the foil is then bent over as at the formed cylinder 34, Fig. 4 (or 32, Fig. 3) and the part completely solder sealed. As shown in Fig. 3, the metal end cap is, in this embodiment, a drawn annular metal disc 33 which is soldered to the inside of the cylinder 32 with filling hole 36 and terminal wire 38 as at 17 and 18, Fig. 1, respectively for connection to the second electrode of the capacitor unit 29. To prevent risk of short circuit between the core 38 which is electrically connected to one electrode of the capacitor unit 29 and the metal end cap 33 which is electrically connected to the other electrode of the said capacitor unit 29, a separator, preferably in the form of a disc 39 having insulating properties (in this case a Presspahn separator has been used) is interposed between the metal end cap 33 and the capacitor unit 29.

What is claimed is:

An electrical condenser comprising an insulating sheet between two metal foils, a metal core wire extending substantially from one edge of said sheet beyond the other edge thereof, one of said metal foils being conductively fastened to said core wire, the other metal foil being insulated therefrom, said metal insulating sheet and foils being wound about said core wire to provide a capacitor unit, a substantially cylindrical metal container for said condenser, having a diameter greater than the capacitor unit, said container having a longitudinal cut in one end thereof to provide a metal tag, said tag being deformed inwardly to make physical contact with said other metal foil to provide electrical connection therewith, an insulating closure for one end of said container sealed to said container and to the extended end of said core wire, and a metal and cap sealed to the other end of said container.

ROY MAYNE BARNARD.
WILLIAM JOHN STRAY.

REFERENCES CITED

The following references are of record in the file of this patent:

UNITED STATES PATENTS

| Number | Name | Date |
|---|---|---|
| 728,780 | Splitdorf | May 19, 1903 |
| 2,091,591 | Hartzell | Aug. 31, 1937 |
| 2,452,540 | Barnard | Nov. 2, 1948 |

FOREIGN PATENTS

| Number | Country | Date |
|---|---|---|
| 452,030 | Great Britain | Aug. 17, 1936 |
| 563,407 | Great Britain | Aug. 14, 1944 |
| 611,900 | Great Britain | Nov. 4, 1948 |